(12) United States Patent
Christenson et al.

(10) Patent No.: US 9,984,708 B2
(45) Date of Patent: May 29, 2018

(54) METHOD FOR MANUFACTURING DISK DRIVE HEAD SUSPENSION STRUCTURES HAVING IMPROVED GOLD-DIELECTRIC JOINT RELIABILITY

(71) Applicant: Hutchinson Technology Incorporated, Hutchinson, MN (US)

(72) Inventors: Michael C. Christenson, St. Louis Park, MN (US); David M. Groschen, Eau Claire, WI (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 0 days. days.

(21) Appl. No.: 15/676,698

(22) Filed: Aug. 14, 2017

(65) Prior Publication Data

US 2018/0012621 A1 Jan. 11, 2018

Related U.S. Application Data

(62) Division of application No. 15/189,424, filed on Jun. 22, 2016, now Pat. No. 9,734,852.

(60) Provisional application No. 62/186,721, filed on Jun. 30, 2015.

(51) Int. Cl.
*G11B 21/16* (2006.01)
*G11B 5/48* (2006.01)
*G11B 5/31* (2006.01)

(52) U.S. Cl.
CPC ............ *G11B 5/3163* (2013.01); *G11B 5/486* (2013.01); *Y10T 29/49025* (2015.01)

(58) Field of Classification Search
None
See application file for complete search history.

*Primary Examiner* — Craig A. Renner
(74) *Attorney, Agent, or Firm* — Nixon Peabody LLP

(57) ABSTRACT

A disk drive head suspension or flexure and method of manufacture. Embodiments include a portion such as a terminal pad or flying lead comprising a base layer, a dielectric layer on the base layer, a conductor layer, a seed layer between the dielectric layer and the conductor layer, and a noncorrosive metal layer on the seed layer side of the conductor layer. The seed layer has a strip that extends beyond the edge of the dielectric layer. The noncorrosive metal layer extends over the strip of the seed layer and into contact with the edge of the dielectric layer.

4 Claims, 6 Drawing Sheets

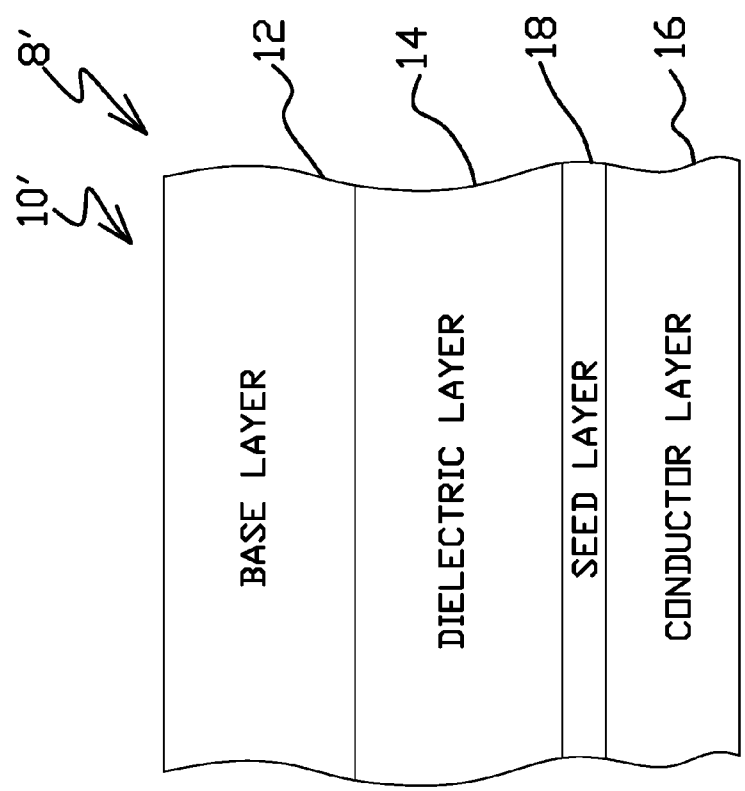

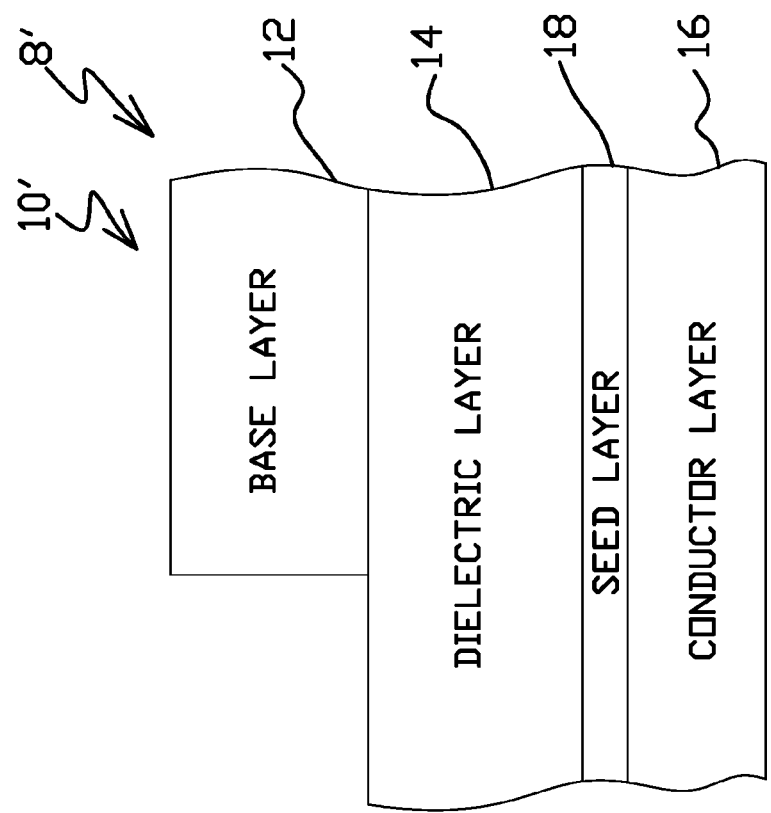

METHOD FOR MANUFACTURING DISK DRIVE HEAD SUSPENSION STRUCTURES HAVING IMPROVED GOLD-DIELECTRIC JOINT RELIABILITY

CROSS REFERENCE TO RELATED APPLICATION

This application is a divisional of U.S. patent application Ser. No. 15/189,424, filed Jun. 22, 2016, entitled DISK DRIVE HEAD SUSPENSION STRUCTURES HAVING IMPROVED GOLD-DIELECTRIC JOINT RELIABILITY, now U.S. Pat. No. 9,734,852, which claims the benefit of U.S. Provisional Application Ser. No. 62/186,721, filed Jun. 30, 2015, and entitled, DISK DRIVE HEAD SUSPENSION STRUCTURES HAVING IMPROVED GOLD-DIELECTRIC JOINT RELIABILITY, each of which are incorporated herein by reference in their entireties for all purposes.

FIELD OF THE INVENTION

The invention relates generally to disk drive head suspensions and flexures. Embodiments of the invention relate to structures having gold (and other corrosion-resistant material)-dielectric interfaces and manufacturing methods.

BACKGROUND

Integrated lead or wireless disk drive head suspensions and flexures commonly include structures having a relatively noncorrosive material such as gold and/or nickel that is plated or otherwise applied to the surface of a relatively more corrosive conductor such as copper or copper alloy. The gold is sometimes plated on the conductor through an opening in a polyimide or other dielectric layer. In structures of these types an edge of the gold plating can form a joint or interface with the dielectric. The Yonekura et al. U.S. Patent Application Publication 2013/0242436, for example, discloses in FIG. 19C a "backside access" flexure terminal having a structure of this type. The terminal face on a wiring layer is exposed by a through hole in a metal layer and an insulating layer, and the terminal face is gold plated.

Unfortunately, the joint between the gold plating and the dielectric layer in structures of these types is susceptible to separation. Any void or crevice that forms between the gold plating and dielectric can provide access to the conductor by moisture or other substances, leaving the conductor vulnerable to undesired corrosion. There is, therefore, a continuing need for improved structures having enhanced gold-to-dielectric joint reliability. Structures of these types that can be efficiently manufactured would be especially desirable.

SUMMARY

Embodiments of the invention include a disk drive head suspension or flexure having a portion, such as a terminal pad or flying trace, comprising a dielectric layer, a conductor layer, a seed layer between the dielectric layer and the conductor layer, and a noncorrosive layer on the seed layer side of the conductor layer. The seed layer has a strip that extends beyond the edge of the dielectric layer. The noncorrosive layer extends over the strip of the seed layer and into contact with the edge of the dielectric layer. Other embodiments include a base layer on the side of the dielectric layer opposite the seed layer.

BRIEF DESCRIPTION OF THE DRAWINGS

FIGS. 2a-2e are detailed illustrations of a structure at a sequence of process steps during the manufacture of the portion of the flexure shown in FIG. 1 in accordance with embodiments of the invention.

DESCRIPTION OF THE INVENTION

Figure 1:
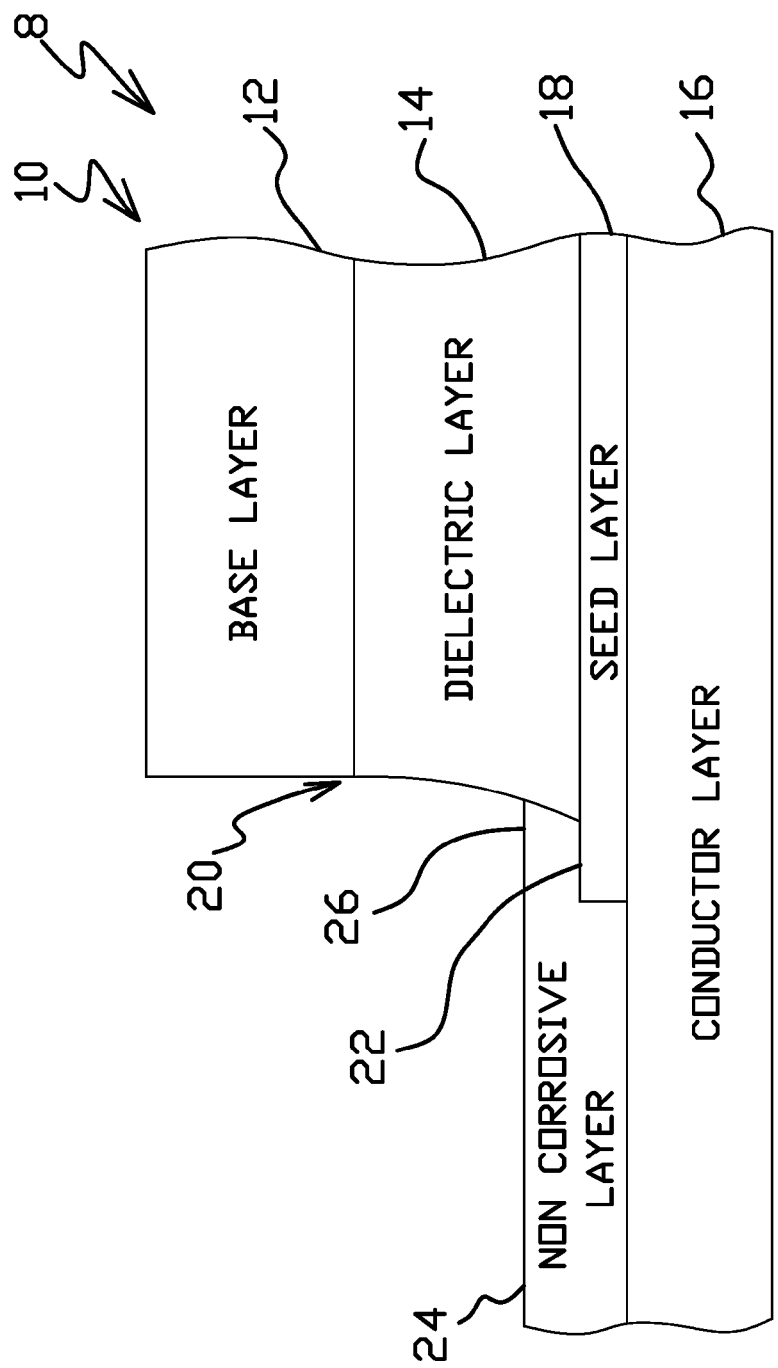
FIG. 1 is a detailed illustration of a portion of a flexure having a noncorrosive material-dielectric joint in accordance with embodiments of the invention.

FIG. 1 is an illustration of a portion 10 of an integrated lead suspension or flexure 8 having a noncorrosive material-dielectric interface or joint in accordance with embodiments of the invention. As shown, the portion 10 includes a base layer 12, which can be a spring metal such as stainless steel, and a polyimide or other dielectric layer 14 on a surface of the base layer. A conductor layer 16 is on a side of the dielectric layer 14 opposite the base layer 12. Conductor layer 16 includes copper or copper alloy in embodiments, a metal that is relatively corrosive when exposed to moisture and other substances. A seed layer 18, which includes chromium in embodiments, is located between the dielectric layer 14 and the conductor layer 16. At least a portion of the dielectric layer 14, and a portion of the base layer 12 in the illustrated embodiment, define an edge 20. A section or strip 22 of the seed layer 18 extends beyond the edge 20 of the dielectric layer 14. A noncorrosive layer 24 is located on the surface of the conductor layer 16 facing the seed layer 18, and includes a portion 26 that overlies the strip 22 of the seed layer and contacts the dielectric layer 14 to form a joint or interface with the dielectric layer at the edge 20. The noncorrosive layer 24 includes gold and/or nickel in embodiments, metals that are relatively noncorrosive with respect to the conductor layer 16 when exposed to moisture and other substances.

The portion 10 can be any of several different structures on the flexure 8. In embodiments, for example, the noncorrosive layer 24 and adjacent portion of the conductor layer 16 can be a backside access terminal pad of an integrated lead (e.g., for connection to a second stage actuator motor (not shown) on the flexure, or on the tail of the flexure for connection to other connectors (not shown) to the disk drive electronics). In these and other embodiments the noncorrosive layer 24 and adjacent portion of the conductor layer 16 can also be base layer-unsupported or flying leads on the flexure 8. These and other embodiments of flexure 8 can include other structures with portions such as 10 having noncorrosive material-dielectric interfaces in accordance with embodiments of the invention.

The section or strip 22 of the seed layer 18 provides a surface to which the noncorrosive layer 24 adheres, thereby enhancing the strength and integrity of the noncorrosive material-dielectric interface. The noncorrosive material-dielectric interface is therefore less susceptible to separation and reduces the possibility of corrosion on the conductor layer 16 at the interface. In embodiments, the strip 22 can be on the order of 300 nm deep (e.g., the distance between the edge of the strip and the dielectric layer 14). The depth of the strip 22 can be greater or lesser distances in other embodiments. The depth and other dimensions of the strip 22 can, for example, be determined based on any of a number of factors, such as the natures and/or dimensions of the dielectric layer 14, conductor layer 16, seed layer 18 and/or noncorrosive layer 24, and/or the nature of the portion 10

(e.g., the extent that the portion 10 is subjected to stresses that might tend to harm the integrity of the interface).

Figure 2C:
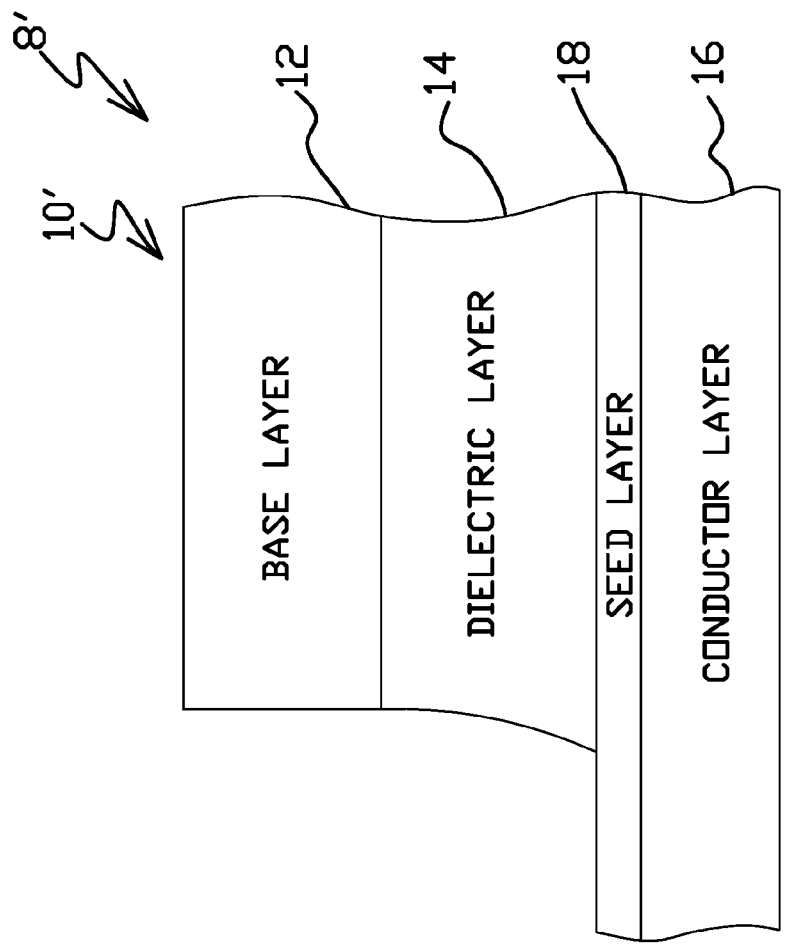

Embodiments of a method including a sequence of steps for forming the flexure 8 having portion 10 can be described with reference to FIGS. 2a-2e. FIG. 2a is an illustration the flexure 8' and portion 10' at an intermediate stage of manufacture, including a structure having the overlying base layer 12, dielectric layer 14, seed layer 18 and conductor layer 16. Conventional additive deposition and/or subtractive processes such as wet (e.g., chemical) and dry (e.g., plasma) etching, electro plating and electroless plating and sputtering processes in connection with photolithography (e.g., use of patterned and/or unpatterned photoresist masks) can be used to manufacture the flexure 8 and intermediate structure of flexure 8'. Additive and subtractive processes of these types are, for example, disclosed generally in the following U.S. patents, all of which are incorporated herein by reference for all purposes: Bennin et al. U.S. Pat. No. 8,885,299 entitled Low Resistance Ground Joints for Dual Stage Actuation Disk Drive Suspensions, Rice et al. U.S. Pat. No. 8,169,746 entitled Integrated Lead Suspension with Multiple Trace Configurations, Hentges et al. U.S. Pat. No. 8,144,430 entitled Multi-Layer Ground Plane Structures for Integrated Lead Suspensions, Hentges et al. U.S. Pat. No. 7,929,252 entitled Multi-Layer Ground Plane Structures for Integrated Lead Suspensions, Swanson et al. U.S. Pat. No. 7,388,733 entitled Method for Making Noble Metal Conductive Leads for Suspension Assemblies, Peltoma et al. U.S. Pat. No. 7,384,531 entitled Plated Ground Features for Integrated Lead Suspensions.

Figure 2D:
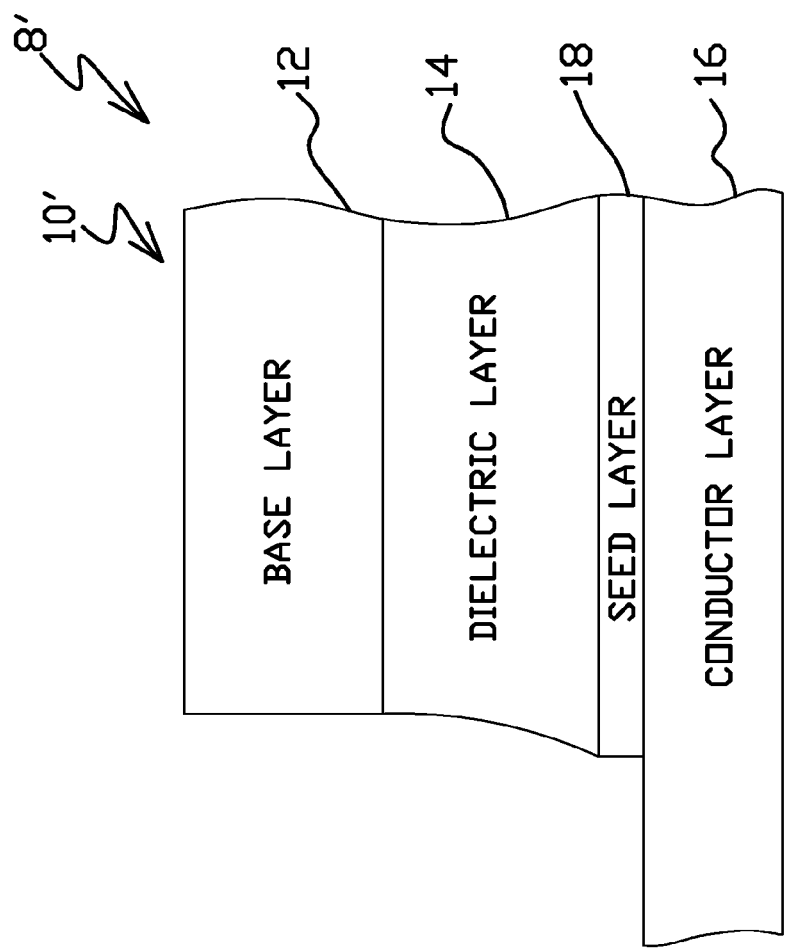
Figure 2E:
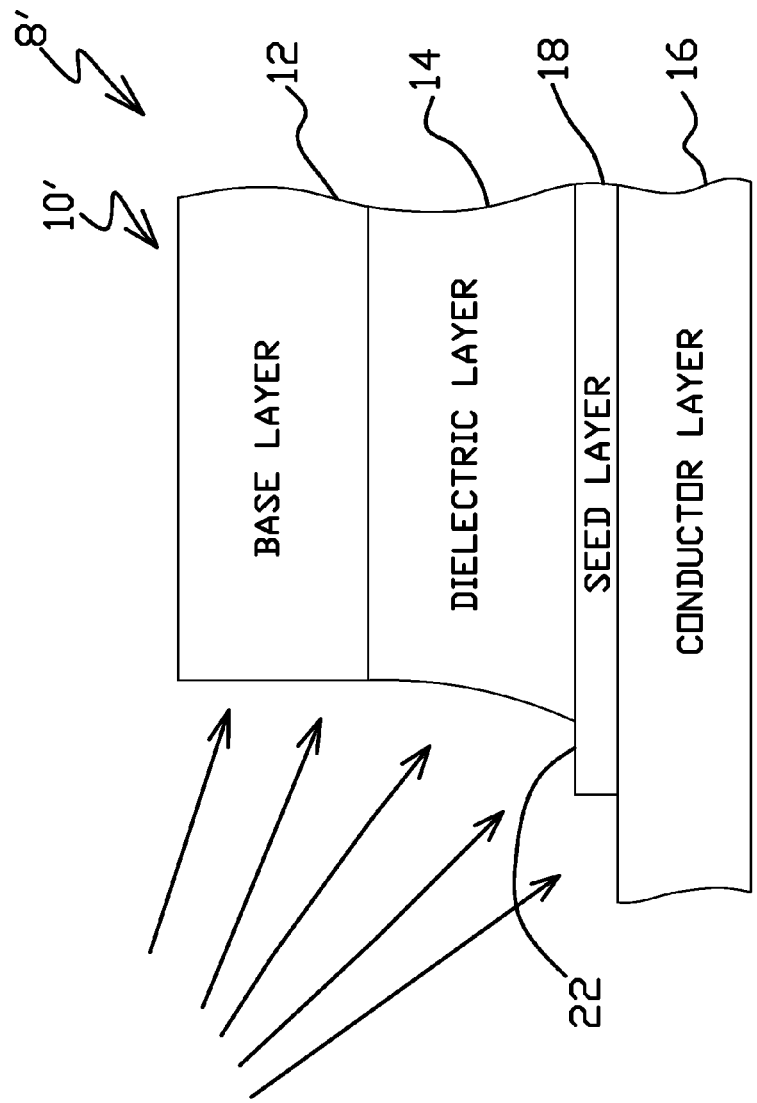

As shown by FIG. 2b, portions of the base layer 12 can be removed from the structure of flexure 8' at the portion 10' (e.g., using patterned photoresist masks and chemical etching). After the portions of the base layer 12 are removed, portions of the dielectric layer 14 at the portion 10' can be removed as shown in FIG. 2c (e.g., by laser etching through a pattern mask). Undesired portions of the seed layer 18 can then be removed as shown in FIG. 2d (e.g., by chemical etching). The strip 22 can then be formed by removing portions of the exposed edge of the dielectric layer 14 above the seed layer 18 (e.g., by atmospheric plasma etching) as shown in FIG. 2e. Following the formation of the portion 10' with strip 22, the noncorrosive layer 24 can be applied (i.e., by plating) to produce the structure shown in FIG. 1.

Manufacturing methods of these types offer important advantages. They enable the efficient fabrication of portions 10.

Although the invention has been described with reference to preferred embodiments, those of skill in the art will recognize that changes can be made in form and detail without departing from the spirit and scope of the invention. For example, other methods can be used to manufacture the portions 10 of flexure 8.

The invention claimed is:

1. A method for manufacturing a disk drive head suspension or flexure, including:
    providing a structure including a conductor layer and a dielectric layer separated by a seed layer, wherein the dielectric layer has an edge;
    removing a portion of the dielectric layer adjacent to the edge to expose a strip of the seed layer extending from the edge of the dielectric layer; and
    applying a noncorrosive layer to the seed layer side of the conductor layer and over the strip of the seed layer and into contact with the edge of the dielectric layer.

2. The method of claim 1 wherein removing the portion of the dielectric layer includes etching the dielectric layer.

3. The method of claim 2 wherein applying the noncorrosive layer includes plating the noncorrosive layer.

4. The method of claim 1 wherein applying the noncorrosive layer includes plating the noncorrosive layer.

* * * * *